UNITED STATES PATENT OFFICE.

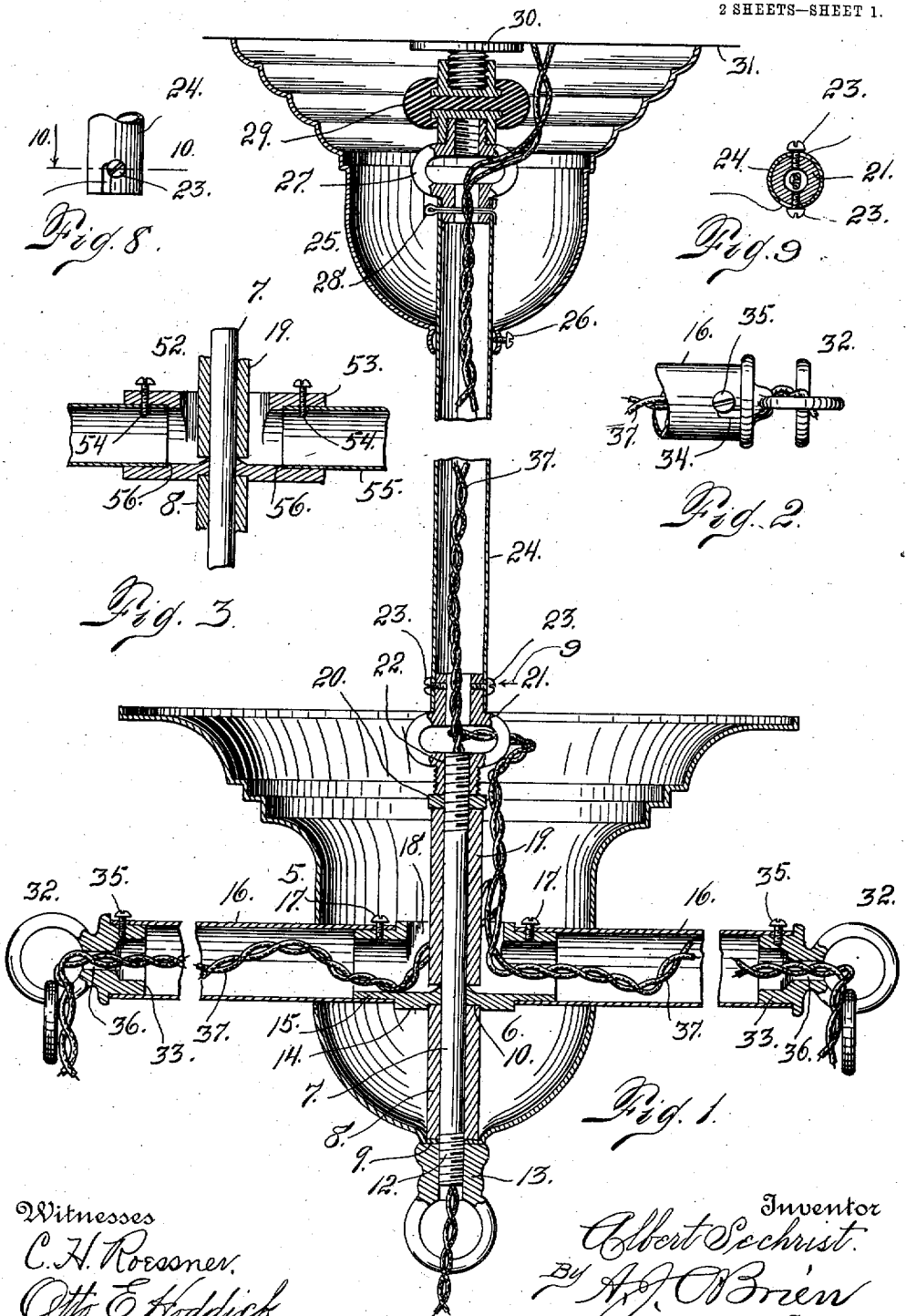

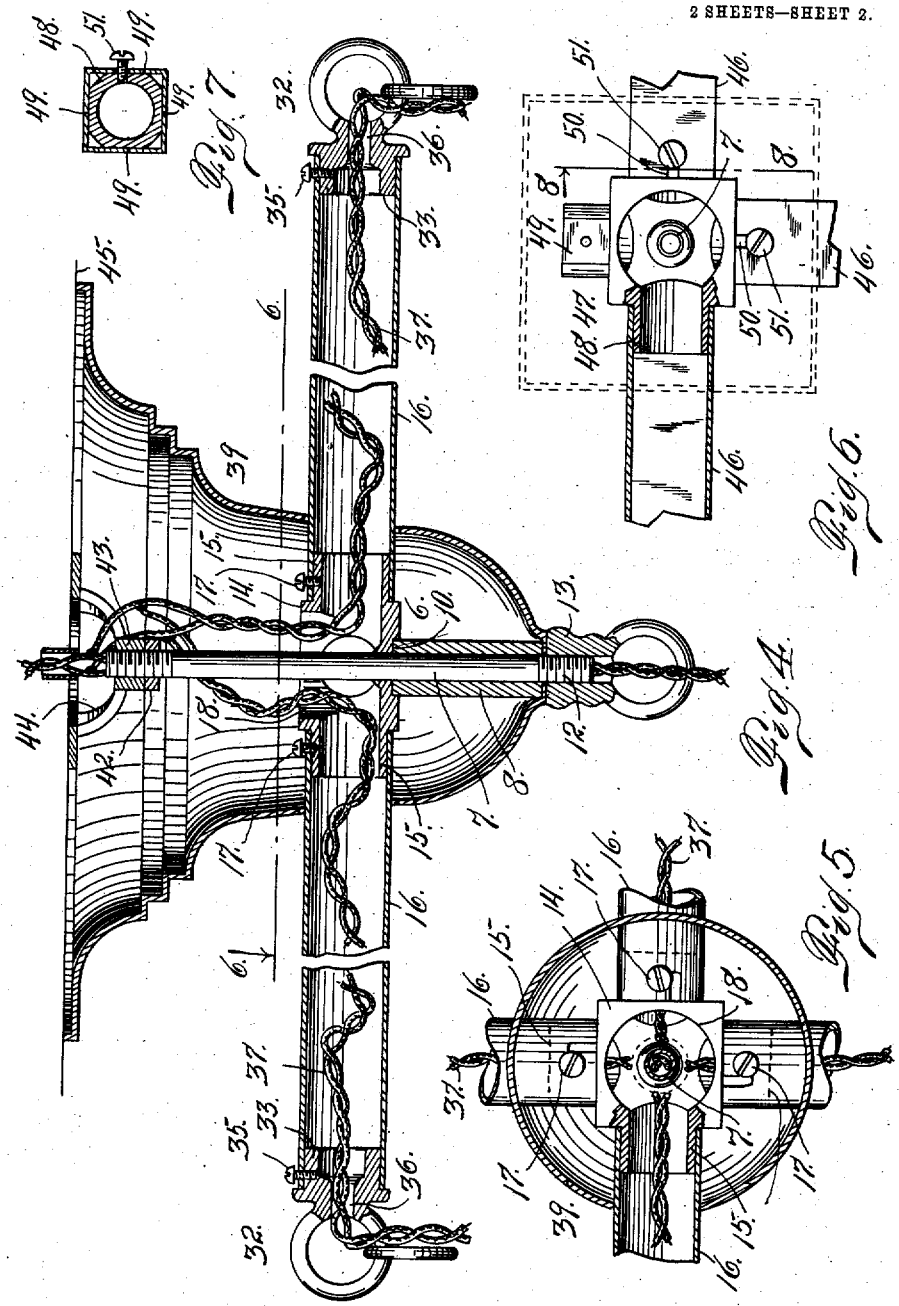

ALBERT SECHRIST, OF DENVER, COLORADO.

CHANDELIER.

1,017,694. Specification of Letters Patent. Patented Feb. 20, 1912.

Application filed September 18, 1911. Serial No. 650,011.

*To all whom it may concern:*

Be it known that I, ALBERT SECHRIST, a citizen of the United States, residing in the city and county of Denver and State of Colorado, have invented certain new and useful Improvements in Chandeliers; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in lighting fixtures of the chandelier and bracket type, being more particularly intended for use in connection with the electric lights of the tungsten type.

An important feature of my present invention consists in locating a connector member within a canopy or fixture body and connecting therewith tube arms inserted in openings formed in the said canopy or fixture body, the inner extremities of the said arms being shaped to fit tubular nipples projecting from a hollow rectangular member, the said member and nipples constituting the said connector. The tube arms are secured to the nipple projections of the connector by a bayonet lock, the said nipples being equipped with pins or screws adapted to enter slots formed in the tube arms, these slots being angular, their inner portions being offset to form a bayonet joint lock, where the nipples of the connector are circular in cross section; while, where the nipples are polygonal in cross section to harmonize with the shape of the tube arms, straight slots alone will suffice, the screws in this case being either originally so adjusted as to make a tight fit, or tightened after the tube arms are applied. The end fittings for the outer extremities of the tube arms are also connected in the same way.

Another feature of the invention consists in employing a spacing sleeve between the lower extremity of the connector within the canopy or fixture body, as the case may be, and the bottom of the said canopy or fixture body, the bottom of the connector being recessed to receive the spacing sleeve. This spacing sleeve prevents the crushing of the canopy or fixture body, should the nut be screwed too tight upon the protruding threaded extremity of the pipe, which passes centrally through the canopy or fixture body.

Where the tube arms are connected with a fixture body suspended from a tube stem, a second spacing sleeve is interposed between the inner surface of the bottom of the tube arm connector and a nut applied to the pipe within the fixture body, the said nut forming a seat for a coupling, which, by means of a double bayonet lock, connects the pipe within the fixture body with the lower extremity of the tube stem, the latter passing upwardly into the canopy and being suitably connected with the ceiling by means of a coupling and other suitable connections.

Where the tube arms are square in cross section and the connector is equipped with projections or nipples of corresponding shape, the canopy or fixture body is preferably square or rectangular in cross section.

Having briefly outlined my improved construction, I will proceed to describe the same in detail, reference being made to the accompanying drawing, in which is illustrated an embodiment thereof.

In this drawing: Figure 1 is a section, taken through a fixture body suspended from a tube stem employed in connection with a ceiling canopy, the fixture body being equipped with my improved connector and tube arm construction, the outer extremities of the tube arms having end fittings connected in accordance with my improvement. Fig. 2 is a top view of the outer extremity of a tube arm, illustrating the manner of connecting the end fitting. Fig. 3 is a vertical section, taken through the connector, the pipe passing therethrough, and the spacing sleeves employed in connection with the fixture body, showing a modified form of construction for securing the tube arms to the connector. Fig. 4 is a sectional view, taken through a ceiling canopy equipped with my improved connector and tube arm construction. Fig. 5 is a horizontal section, taken on the line 6—6, Fig. 4, looking downwardly. Fig. 6 is a top plan view, partially in section, of my improved tube arm connector, showing the nipples or projections polygonal in cross section to receive square tube arms, two of which are shown partly broken away, while a third is shown partly in section and partly broken away, the fourth arm being omitted altogether. In this view, the shape of the canopy in horizontal section is indicated by dotted lines. Fig. 7 is a section, taken on the line 8—8 of Fig. 6, looking toward the right. Fig. 8 is a fragmentary detail elevation looking in the direction of arrow 9, Fig. 1, showing one side of the double bayonet lock connection between the lower extremity of the tube stem and the joint connected with the pipe of the fixture body. Fig. 9 is a section, taken on the line 10—10 Fig. 8.

The same reference characters indicate the same parts in all the views.

Let the numeral 5 designate a fixture body within which is located a connector 6, through which passes a pipe 7, the bottom opening of the connector having a perforation to fit said pipe. The connector is supported within the fixture body by means of a spacing sleeve 8, whose lower extremity rests upon the bottom 9 of the fixture body, while its upper extremity enters a recess 10 formed in the bottom of the connector around the perforation through which the pipe 7 passes. The lower portion 12 of the pipe 7 protrudes through an opening formed in the bottom of the fixture body, and is threaded to receive a nut 13, which is screwed against the bottom of the canopy bottom on the outside.

The connector 6, as illustrated in the drawing, consists of a central rectangular hollow part 14, having tubular extensions or nipples 15, which, as illustrated in Fig. 1, are cylindrical in shape and fashioned to receive the inner extremities of the tube arms 16, which slip over the nipples 15, the latter being equipped with screws 17, whose shanks enter angular slots formed in the nipples, whereby a bayonet lock is formed. The connector 6 is open at the top, as shown at 18, and a second spacing sleeve 19, surrounding the pipe 7, engages at one extremity the bottom of the connector, while its opposite extremity engages a nut 20 threaded on the upper portion of the pipe 7. This nut, when properly adjusted, forms a stop which engages the lower extremity of a coupling 21, whose lower portion is interiorly threaded, as shown at 22, to receive the upper threaded extremity of the pipe 7. By employing the nut 20 to constitute a stop, as aforesaid, it becomes impossible to screw the pipe into the coupling 21 far enough to crush the fixture body. The upper extremity of the coupling 21 is connected by means of a double bayonet lock 23 with the lower extremity of the tube stem 24, the latter protruding into a ceiling canopy 25, the latter being connected with the tube stem by a set screw 26. The upper extremity of the tube stem is connected within the canopy with a coupling 27 by means of a cotter pin 28, the upper extremity of the coupling being connected with an insulating joint 29, attached to a member 30 secured to the ceiling 31. In this form of construction, the outer extremities of the tube arms are equipped with end fitttings 32, whose plugs 33 enter the tube arm extremities and are provided with angular slots 34 to form a bayonet lock in combination with screws 35, which are applied to the outer extremities of the tube arms for the purpose.

The end fittings are perforated, as shown at 36, to receive the electrical conductors 37, which are carried inwardly into the tube or connector 6 and thence upwardly through the opening 18 in the top of the connector, and thence upwardly through the fixture body into and through the coupling 21, and thence upwardly through the tube stem, and through the coupling 27, and thence to the ceiling.

In the form shown in Fig. 4, the construction is the same, except that the tube arms 16 are applied to a ceiling canopy 39. In this case, a spacing sleeve 8 is interposed between the bottom of the connector 6 and the bottom of the canopy, an opposing nut 13 being applied to the lower protruding extremity of the pipe 7. In this case, the extremities of the tube arms are secured to the tubular extensions or nipples 15 by a bayonet lock, the inner extremities of the tube arms having angular slots coöperating with screws 17 for the purpose, as best illustrated in Fig. 5. In this form of construction, the spacing sleeve 19, extending above the connector 6, is omitted, and a lock nut 42 is applied to the upper portion of the pipe 7 and constitutes a stop to prevent the upper extremity of the pipe 7 from being screwed too far into the nut 43 forming a part of the spider-shaped member 44 connected with the ceiling 45. The end fittings 32 in this form of construction are connected with the tube arms in the same manner as illustrated in Fig. 1 and heretofore described.

In the form of construction shown in Fig. 6, the tube arms 46 are square in cross section and are secured to a connector 47 by applying the inner extremities of the tube arms to tubular extensions 48, which are flattened on four sides 49 by grinding down a cylindrical part on four sides. The tube arms are provided with straight slots 50 to engage screws 51. These screws may be tightened, if desired, in order to lock the inner extremities of the tube arms securely in place, since by virtue of the polygonal shape of the extensions 48 of this form of connector, whereby the tube arms are prevented from turning thereon, the angular slots to form the bayonet lock cannot be employed.

In the form of construction shown in Fig. 3, the connector, which I will designate 52, is of the same construction as the connector 6, except that its extensions 53 are provided with inwardly-projecting pins 54 adapted to interlock with angular slots formed in the inner extremities of tube arms 55, which are inserted in the extensions 53 of the connector and engage shoulders 56 formed thereon.

From the foregoing description, the use of my improvement will be readily understood. An important advantage of this form of construction consists in the provision for readily attaching and detaching the tube arms from the canopy or fixture body, and this is made practicable by the employment of the interiorly-located connector equipped with screws or pins adapted to enter the slots of the tube arms, whether angular or straight, as the case may be.

The tube arms may be readily disconnected from the canopy or fixture body, whereby they may be packed into small compass for shipping purposes.

After the connector has been mounted in the canopy or fixture body, the tube arms may be quickly attached therewith and may be readily removed for purposes of repair or during the original assembling and wiring of the lighting fixture.

Having thus described my invention, what I claim is:—

1. A fixture body equipped with a connector having a hollow central member provided with tubular projections, adapted to receive the inner extremities of tube arms, a pipe centrally located in the fixture body and passing through the connector which is perforated for the purpose, and a spacing sleeve surrounding the pipe and interposed between the bottom of the connector and the bottom of the fixture body for supporting the connector within the latter.

2. The combination with a fixture body, of a pipe centrally located therein, a tube arm connector also located therein and perforated to receive the said pipe, the tube arm connector being composed of a central hollow member and tubular projections extending radially therefrom, the said projections being reduced and shouldered to receive tube arms, and a spacer surrounding the pipe within the fixture body and interposed between the tube arm connector and the bottom of the fixture body, the said pipe protruding below the fixture body, its protruding portion being threaded, and a nut applied to the lower threaded extremity of the pipe, substantially as described.

3. The combination with a canopy, of a tube arm connector supported therein, the said connector being hollow and having laterally projecting tubular parts, fastening devices applied to said tubular projections, and tubular arms having slots to receive said fastening devices, the tube arms being fitted over the connector extensions, substantially as described.

4. The combination with a fixture body and a centrally-located pipe, of a connector through which the said pipe passes, the connector being located within the fixture body, means for supporting the connector within the fixture body, and tube arms entering openings formed in the fixture body, the inner extremities of the tube arms being detachably fitted to the connector, substantially as described.

5. The combination with a fixture body and a pipe centrally located therein, of a connector through which the pipe passes, the connector being hollow and having tubular extensions, screws located thereon for fastening purposes, and tube arms entering openings formed in the fixture body, their inner extremities adapted to surround the tubular extensions of the connectors and being slotted to receive the screws mounted thereon, substantially as described.

6. The combination with a fixture body and tube arms mounted thereon, of end fittings inserted in the outer extremities of the tube arms, the said end fittings having fastening devices and the said tube arms being slotted to receive the said fastening devices, substantially as described.

7. The combination with a fixture body, of a tube arm connector supported therein, the said connector being hollow and having tubular extensions equipped with fastening devices, and tube arms whose inner extremities are adapted to surround said tubular extensions and are equipped with angular slots to receive the fastening devices of the connector to form a bayonet lock, substantially as described.

8. The combination with a fixture body and tube arms mounted thereon, of end fittings inserted in the outer extremities of the tube arms, the former being equipped with fastening devices, and the tube arms having angular slots adapted to receive the fastening devices to form a bayonet lock, substantially as described.

9. The combination with a fixture body and a centrally-located pipe, of a tube stem with which the upper extremity of the said pipe is connected, a tube arm connector mounted in the fixture body, a spacing sleeve surrounding the pipe and interposed between the tube arm connector and the bottom of the fixture body for supporting the tube arm connector in place, a nut mounted on the upper part of the said pipe, and a spacing sleeve interposed between the bottom of the tube arm connector and the said nut, the tube arm connector being hollow and having extensions equipped with fastening devices, and tube arms whose inner extremities are fitted to said extensions and slotted to receive said fastening devices, substantially as described.

10. A fixture body equipped with a connector having a hollow central member provided with tubular projections adapted to receive the inner extremities of the tube arms, and a spacing sleeve surrounding the pipe and interposed between the body of the connector and the fixture body for supporting the connector within the latter.

In testimony whereof I affix my signature in presence of two witnesses.

ALBERT SECHRIST.

Witnesses:
F. E. BOWEN,
CLORA E. BRADEN.

Copies of this patent may be obtained for five cents each, by addressing the "Commissioner of Patents, Washington, D. C."